United States Patent
Trim et al.

(10) Patent No.: US 11,997,565 B2
(45) Date of Patent: May 28, 2024

(54) TRAJECTORY MASKING BY INJECTING MAPS USING VIRTUAL NETWORK FUNCTIONS

(71) Applicant: International Business Machines Corporation, Armonk, NY (US)

(72) Inventors: Craig M. Trim, Ventura, CA (US); Timothy Davis, Upton, CA (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/475,533

(22) Filed: Sep. 15, 2021

(65) Prior Publication Data
US 2023/0085591 A1    Mar. 16, 2023

(51) Int. Cl.
*H04W 4/024* (2018.01)
*H04W 4/021* (2018.01)
*H04W 4/029* (2018.01)

(52) U.S. Cl.
CPC ........... *H04W 4/024* (2018.02); *H04W 4/021* (2013.01); *H04W 4/029* (2018.02)

(58) Field of Classification Search
CPC ..... H04W 88/02; H04W 4/029; H04W 36/32; H04W 4/024; H04W 4/021; H04W 48/14; H04W 4/40; H04W 64/00; H04W 48/04; H04W 12/63; H04W 12/64; H04W 8/24; H04W 12/02; H04W 12/12; H04W 4/02; G01C 21/3889; H04L 41/40; G06Q 10/047

See application file for complete search history.

(56) References Cited

U.S. PATENT DOCUMENTS

| | | | |
|---|---|---|---|
| 9,291,465 B2 | 3/2016 | Tijink | |
| 10,402,771 B1* | 9/2019 | De | ......... H04W 4/027 |
| 10,782,143 B2 | 9/2020 | Chintakindi | |
| 2015/0235240 A1 | 8/2015 | Chang | |
| 2019/0182642 A1* | 6/2019 | Tao | ......... H04W 4/02 |
| 2020/0245141 A1* | 7/2020 | Antonatos | ......... H04W 12/02 |
| 2022/0408353 A1* | 12/2022 | Hegde | ......... H04W 24/08 |

OTHER PUBLICATIONS

"5G technology needs edge computing architecture", CISCO, Cisco Networking, 12 pps., Downloaded from the Internet on Aug. 17, 2021, <https://www.cisco.com/c/en/us/solutions/enterprise-networks/edge-computing-architecture-5g.html>.
"Optimizing Network Applications for 5G—Ericsson", Apr. 21, 2017, ericsson.com, 3 pps., <https://www.ericsson.com/en/news/2017/4/optimizing-network-applications-for-5g>.
(Continued)

*Primary Examiner* — Nizar N Sivji
*Assistant Examiner* — Jing Gao
(74) *Attorney, Agent, or Firm* — David K. Mattheis

(57) ABSTRACT

Masking a route by determining a first location of a first user, receiving destination data for the first user, generating a plurality of map segments according to the first location and the destination data, presenting a first map segment to a second user, determining a second location of the first user, and presenting a second map segment to the second user according to the second location.

20 Claims, 4 Drawing Sheets

(56) References Cited

OTHER PUBLICATIONS

"Why Edge Computing is Key to a 5G Future", Data makes possible by Western Digital, Jul. 26, 2018, 4 pps., <https://datamakespossible.westerndigital.com/edge-computing-key-5g-future/>.
Chen et al., "VTracer: When online vehicle trajectory compression meets mobile edge computing", Submitted on Oct. 20, 2019, IEEE Systems Journal, 14(2), 1635-1646.
Johnston et al., "5G Edge Computing Whitepaper", 12 pps., PromptCloud, <https://transition.fcc.gov/bureaus/oet/tac/tacdocs/reports/2018/5G-Edge-Computing-Whitepaper-v6-Final.pdf>.
Li et al., "Privacy-Preserving Trajectory Data Publishing by Dynamic Anonymization with Bounded Distortion", 2021, ISPRS International Journal of Geo-Information, 10(2), 78, 20 pps.
Mell et al., "The NIST Definition of Cloud Computing", National Institute of Standards and Technology, U.S. Department of Commerce, NIST Special Publication 800-145, Sep. 2011, 7 pages.
Rash, "It Needs to Start Thinking About 5G and Edge Cloud Computing", Feb. 7, 2018, PC Mag, 8 pps., <https://in.pcmag.com/feature/119014/it-needs-to-start-thinking-about-5g-and-edge-cloud-computing>.
Wang et al., "Segmented Trajectory Clustering-Based Destination Prediction in IoVs", 2020, IEEE Access, 8, 98999-99009.
Zhao et al., "A Privacy-Preserving Trajectory Publication Method Based on Secure Start-Points and End-Points", 2020, 12 pps., Mobile Information Systems.

\* cited by examiner

TRAJECTORY MASKING BY INJECTING MAPS USING VIRTUAL NETWORK FUNCTIONS

FIELD OF THE INVENTION

The disclosure relates generally to route or trajectory masking through map injection using virtual network functions. The disclosure relates particularly to route masking by generating and injecting map segments using 5G virtual network functions.

BACKGROUND

In 5G telecom networks, the Medium Access Control (MAC) Layer of the New Radio standard provides services to the Radio Link Control (RLC) Layer controls are provided in the form of logical channels. These logical channels are virtualized communication network interface that is used to transfer IO commands (network data packets) and control instructions over radio interface and 5G fixed access network.

One of the major components of 5G architecture is Virtual Network Functions (VNF), that enables logical slicing, and many other important infrastructure operations, in 5G networks. 5G-Virtual Network Functions comprise additional capabilities along with network slicing models of 5G including location-based services, evolved bode B (eNodeB) services, and device tracing systems. These geo-location tracing systems are the key infrastructure for geofencing applications and location-based marketing that leverage VNF to address situational marketing and location-based information manifestations. The VNF comprises all the Physical Network Functions (PNF) in physical control and user plane separation (CUPS) and enables a consolidated platform for multi-domain orchestrator to subscribe for network slicing states and data transmission control to user equipment (UE) device.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable masking a route through controlled map segment injection.

Aspects of the invention disclose methods, systems and computer readable media associated with masking a route by determining a first location of a first user, receiving destination data for the first user, generating a plurality of map segments according to the first location and the destination data, presenting a first map segment to a second user, determining a second location of the first user, and presenting a second map segment to the second user according to the second location.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
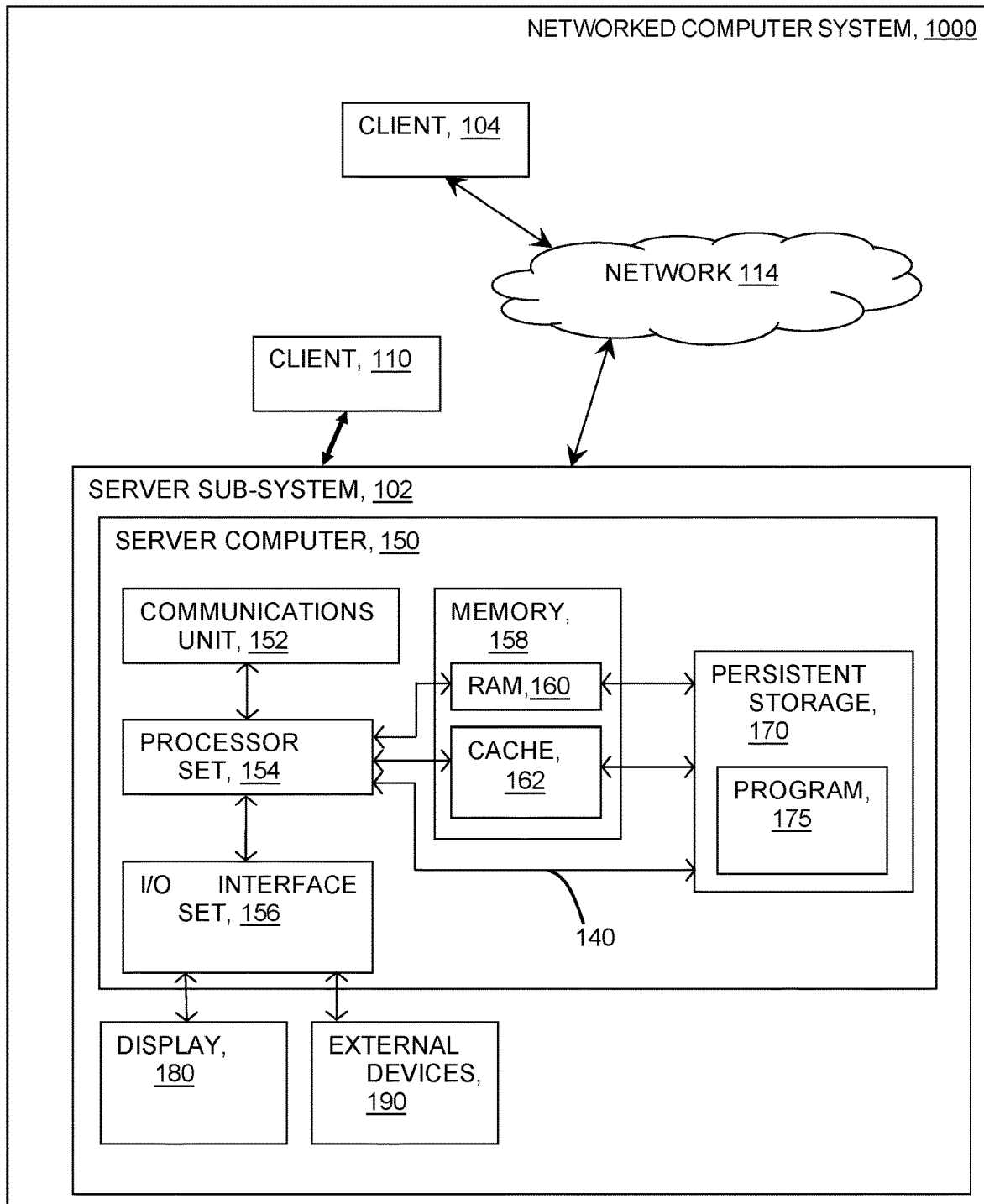
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

The concept of organized rental cab services gained popularity because of its advantage of door-to-door service, and the technological advancement along with competitive price points. These cab services have tremendous potential for growth in densely populated countries where parking is major problem and public transportation is overcrowded. These cab services offer personalized transportation that will be used by a traveler to reach their destination.

Personal cabs are usually preferred over shared cabs as they run over optimized routes and offer at-door pickup and drop-off services. As the passenger is alone in the cab, there are concern about passenger safety when using these taxicab services. Though, many cab service providers appear reliable, there are still chances that the safety policy can be violated by the drivers. There are reported cases where women travelers have suffered because of safety violations by cab drivers. Such instances raise safety questions for women, children and elderly individuals regarding these services. In other reported instance of abuse and robbery, the driver took a detour, claiming it was a faster route necessitated by the day's traffic conditions. Disclosed embodiments addresses these issues by masking the traveler's complete route to avoid detours by cab drivers for better user safety. The driver is provided only small portions of the complete route, reducing the opportunity for unnecessary detours.

Disclosed embodiments provide methods working in the 5G-VNF, in collaboration with eNodeB Radio resource maps and PNF function's device positioning system, to identify the location of the user during a cab ride. The invention collects user pick-up and destination details from cab booking applications, maps route paths to generate the segments of the user's route to their destination. The invention generates smaller, independent, segmented child maps dynamically, using a received route, along with segmented map constraints filtering.

The control plane (CP) of Physical Network Function polls for the device location and utilizes user latitude-longitude as a key to unlock access to the next segment child map during travel. This enables access to the next map view once the cab reaches to a defined map injection location. The method uses user device location as a key to unlock the next segmented map path. The invention eliminates potential map injection points that may create confusion for the driver and offers a complete segment of map to the user while riding. As the driver is unaware of the end location, this increases safety during cab travel, reduces the chances of malicious detours, and builds confidence and trust in the service provider.

Today, there is no way by which the traveler's route and final destination information can be intelligently masked from the cab booking provided driver. Typically, the driver receives user destination location information when the ride starts. There is a chance that the driver may take a malicious detour and the traveler may be exposed to an unpleasant situation like an assault of robbery. In some instances, cab drivers refuse to accept riders when the final destination is not favorable for the driver. In some instances, the cab driver rejects the prospective rider after boarding because the destination is too far and/or traffic is too heavy. As the ultimate destination and route are known to him, rider safety may be threatened on lonely roads. Hence there is a need to mask the destination and path based on the current latitude and longitude location of the user device at the start, and the driver should only be provided a portion of the route path to increase rider safety.

Booking App-based implementations may not work because there is no mechanism to validate that the vehicle has reached the desired location and it is possible to mark false location check-ins to get complete destination location and path. There is a need to control this data using real time location tracking outside the booking application using next generation technology. 5G-VNF has its own in-built navigation and location-based service that helps the disclosed implementations effectively mask user routes and destinations.

As an example, a woman wants to go to a location which is far from her current location. Part of the route is sparsely populated, and she is travelling at night. The passenger does not want to share the complete route and destination with the driver as the passenger is also very far from her usual territory. One solution injects multiple hops into the route using a cab booking application, but there is no validity of location. The driver may perform false check-ins to all the hop locations on the map and get the final destination location. Disclosed embodiments track the user and driver location in real time and outside the user's/driver's control and performs the map masking based on the current location, speed and other artifacts such road intersection details and origin and destination crowd sizes, to provide only the limited route to the driver.

Disclosed embodiments provide methods that will, at CP (5G-CUPS Control Plane) of Virtual Network Function of 5G telecom network, in conjunction with multi-domain E2E service management plane 'control & user plane separation' (CUPS), collect user location data—with user consent, and generate selective route child maps for the service driver for cab booking applications. Embodiments include integration of cab booking applications as client instances, communicating with the service instance running at the static, or cloud positioned, cab booking servers via an intermediate 5G-VNF that controls the map-based facilities and destination location masking for user safety.

In use, this service initiates at the UE location and creates a logical channel with the eNodeB of 5G network over Radio bearer. The MAC based communication will be extended to S1 and VNF containing the map reduction and child map services. This data traffic channel (DTCH) is a special purpose channel of the CP that allows user location sharing and enables device tracing at VNF. Because of the telecommunication regulations, the location of user cannot be traced directly without user consent, hence this special purpose CP-DTCH will be created as a flag from the UE device, to enable the device location for cab services with user consent.

Once the channel is created, Virtual Network Function collects the DTCH data and device UUID, and accordingly instructs the PNF to inject geo-location tracing for the selected device on the eNodeB resource map. The physical Network Function locates the device using PNF based enhanced positioning algorithms. Such algorithms locate the device without GPS location collection. 5G small cell technology has mechanisms to get position coordinates using physical downlink control channel (PDCCH) response packets.

In an embodiment, the method instance in the VNF initiates the communication with the server, or the service instances, over cloud. 5G's in-band MAC based communication will be started to gather the user route information for a selected route. Start location, end location and current path coordinates are generated by the server instance (the instance also collects data from traffic monitors and other monitoring tools) and shares the information with the VNF instance.

Once the complete route/trajectory data is received by the VNF instance, boundary regions are identified, based on the defined configuration policy. In an embodiment, boundary region size is determined according to a configuration setting. In this embodiment, the configuration setting has a default value which the user may adjust using a graphical user interface of the user route masking application. Further, additional inputs are collected from respective PNF outputs such as the speed of the vehicle, path information, time of day, and situational artifacts, are gathered to enable real time map masking for the user. The boundary regions are determined based on the collected artifacts and configuration constraints, and accordingly, the method selects child-map segments' injection points. The injection points are filtered based on various defined constraints to give a smooth experience to the driver. For example, a map segment must not end at road junction, as doing so may confuse the driver about further movement. As another example for a car travelling at 60 mph, the child maps should have more route/trajectory shown than child maps for the car moving at 25 mph. Once the method detects that an injection point is within a defined range threshold of the user/device/car, the VNF polls for the exact device location using PNF LTE positioning inputs. As the car approaches the child-map injection point, the method calculates the route/trajectory map segment, to the next injection point, and injects the map segment and injection point location data to the user and driver UE client app instances. As the method provides the incremental map segments to the client applications, the method masks the complete user route/trajectory and supplies each succeeding map segment to the driver when the device location approaches the defined injection point of the previous segment. VNF uses device location as a key to unlock access to and extract the next segmented child map and ensures the user security using 5G VNF.

The implementation can be extended for ATM cash carrying vans and related use cases requiring route security. As the destination location is masked, very limited information is available to the driver, reducing unpleasant interactions during cab booking and other interrelated fields and improving user trust in service providers.

In accordance with aspects of the invention there is a method for automatically determining a route for a traveler and masking this route such that a driver only has access to portions of the complete route. Further the driver is unaware of the location of the final traveler's destination until arrival at that destination. Though the final destination appears as part of a final map segment provided to the driver, the driver is unaware that this segment is the final map segment of the route until they arrive at the final destination. Location data while in transit is collected directly from UE by disclosed methods using 5G VNF and without input from the driver or the traveler.

Aspects of the invention provide an improvement in the technical field of monitored transportation services. Conventional monitored transportation systems utilize driver input to update progress along a route and/or arrival at a destination. In many cases drivers may be able to deceive or spoof the monitoring system and take advantage of vulnerable passengers. Disclosed embodiments utilize device 5G VNF level location data extracted independent of any driver or traveler interaction. Such embodiments extract destination data from a booking application, determine a traveler's route, break the route down into segments and provide those segments to the driver as progress along the route dictates. Embodiments mask the complete route and terminal destination information from the driver and provide the complete map to the traveler, enabling safer travelling experiences.

Aspects of the invention also provide an improvement in computer functionality. In particular, implementations of the invention are directed to a specific improvement to the provision of monitored transportation services. Rather than providing a driver with a destination and leaving the details of the routing to the driver's discretion, disclosed embodiments determine a route from the start and end points for the traveler and determine route segments and associated way points along the route. Disclosed embodiments then provide the traveler with the complete routing information while providing the driver only a currently relevant portion of the route. Systems and methods update the route segment provided as travel progresses and way points are reached. The systems utilize 5G PNF level data from a user's device to track location and progress along the route. This data is less subject to manipulation by a user/driver, enabling more secure and therefore safer transit. The compete route is withheld from the driver and the final destination of the traveler becomes apparent only upon arrival.

In an embodiment, one or more components of the system can employ hardware and/or software to solve problems that are highly technical in nature (e.g., initializing network and UE 5G-VNF instances, polling CP-DTCH requirements, polling CP-DTCH location data, mapping a current routing for a user, segmenting the routing according to configured policies, defining and filtering segment injection points according to defined constraints, defining map segments according to final injection point locations, establishing real-time CP-DTCH radio resource map location data linkages, polling real-time locations, unlocking access to successive map segments according to real-time location data— injection point correspondence, pushing unlocked map segment data to UE, etc.). These solutions are not abstract and cannot be performed as a set of mental acts by a human due to the processing capabilities needed to facilitate destination and route/trajectory masking, for example. Further, some of the processes performed may be performed by a specialized computer for carrying out defined tasks related to route masking. For example, a specialized computer can be employed to carry out tasks related to masking route and destination information, or the like.

In an embodiment, multiple connected instances of the method are initialized. The instances include server and client instances. Each of the user's and driver's UE include a client instance, the cab booking application may be linked to an additional client instance, the server instance resides upon a virtual network function (VNF) layer of a 5G telecommunications server to receive and process the data. At initialization, the necessary data structures and VNF locations comprising the RADIO_ACCESS_MAPS, accessibility methods, constraining boundary values, injection point validity factors, as well as the respective UE CP-DTCH and common control channel (CCCH), mappings between the UEs and the 5G server.

In an embodiment, the cab service client initiates CP-DTCH with the server VNF, providing the CP_TAGGING_DTCH data associated with the user's current desired destination. In this embodiment, the method traverses the provided map data generating the tuple of <DTCH universal unique identifier (UUID), Connection status, APPLICATION_(PID process identifier)> for the server VNF engine, enabling the establishment of a connection to the client instance from the server instance. Following the establishment of the connection, the server VNF begins polling the incoming data from the cab service.

In an embodiment, the driver's UE connects to the server instance through the cab serve client. In an embodiment, the driver's UE maintains a client instance and connects directly to the server instance as described above.

Similarly, the user (passenger) UE client instance connects to the server instance to provide user and cab booking service identifying data, enabling VNF polling of appropriate routing data for the user from the cab booking service instance. The user's client also enables the user to opt-in to location tracking using radio resource mapping location data from their device In an embodiment, the VNF initiates in-band MAC communications between the clients and server over cloud resources. The method completes handshaking and service authentication between the client device instance and the identified PIDs of the server. The VNF gathers route information for the user's booking according to the identifying information provided by the user's client instance. The method generates and saves a second tuple, <start location, end location, and current path coordinates>, in a metadata mapper of the VNF corresponding to the current route of the user.

After receiving the complete routing, the VNF server instance parses the complete routing according to a configuration policy associated with the user. The configuration policy includes setting associated with the types of roadways which are acceptable, areas to be avoided, driver notice buffer timing, etc. The server instance polls additional data from the user's UE instance including vehicle location, speed, path, time. In this embodiment, the server VNF further gathers situational artifacts for beginning the process of generating route map segments. In an embodiment, situational artifacts include road intersection details gleaned from parsing the map through a map API, origin and destination crowd details gleaned from analysis of cab company booking data and application user data. The route data is parsed by the server instance to extract route details including road junctions, neighborhood details, posted speed limits, average actual speeds, etc. Such artifacts enable appropriate map segment injection points to be defined. In an embodiment, the complete routing is pushed to the device of the first user, the traveler or passenger so that they may monitor the progress of the vehicle towards the final destination.

After gathering the route data, vehicle data and situational artifacts, the server instance parses the complete route into segments according to the overall length of the complete route. In an embodiment, the method divides the complete route into a plurality of individual linked and/or overlapping child map segments, such as two-five segments, or more depending upon the length of the complete route. In an embodiment, the method devices the complete route according to the average speeds along respective portions of the route such that each map segment corresponds to a similar amount of time of the total time estimated for completing the route at the average speeds along it.

For each segment, the method defines an initial injection point. The initial injection point refers to a location at which the method will provides the next route map segment to the driver by pushing the map segment data to the driver's UE as the user's UE location data indicates the injection point has been reached. Acceptable injection points include plausible destinations for the passenger.

In an embodiment, the method defines initial segment injection points at or near the end of each defined segment of the complete route. In this embodiment, the method considers user location within the child map and the vehicle speed in order to provide the next map to the driver without creating a distraction due to an expiring child map. In this embodiment, the method filters the initial injection points according to the situational artifacts. The method filters out implausible destination points identified as injection points. For example, an initial injection point at an intersection will be rejected or filtered out as ending a segment at an intersection may distract the driver trying to anticipate where to position the vehicle as they approach the intersection. A driver approaching a major interchange on a multi-lane road needs to know which lane to be in before arriving at the interchange. Similarly, the method filters out injection points in the middle of a bridge or along a stretch of high-speed freeway as implausible stopping/destination points for the passenger.

In an embodiment, the method shifts initial injection points along the defined route to locations satisfying the constraints. In this embodiment, the method shifts each filtered injection point forward along the route and backward along the route until finding a constraint satisfying injection point location. This leads to two new possible injection points, one forward, one back. In this embodiment, the method defines the new injection point as the new possibility closest to the original injection point.

After defining the final set of injection points corresponding to the complete routing of the passenger, the method defines route map segments corresponding to each defined injection point. Each map segment includes a highlighted route segment beginning at starting point and ending at a way point. The first map segment begins at the passenger's origin and ends at a first way point—the first injection point. The second map segment shows a route segment beginning at the first way/injection point and ending at the second way/injection point. Each map segment shows additional roadway details without highlighting the route portions before and after the highlighted portion. The configuration policies define the extent of the additional details.

In an embodiment, the method defines a complete set of segmented child maps and associated injection points from the initial complete routing. In an embodiment, the method divides the initial routing map according to time and/or distance into segments. In this embodiment the method generates a first map segment and associated first injection point. As the user's location data indicates a crossing of a boundary for the first injection point, the method generates a second map segment for the next portion of the route using current additional data such as vehicle speed and local traffic data. The method generates an injection point for the second segment and pushes the segment/injection point data to the driver's instance and optionally, the booking service.

In an embodiment, the method starts MAC communications using the S1 interface enabling the collection of real-time device location date based upon the CP DTCH radio resource map. The user has previously opted into the collection and use of this data by the method. In this embodiment, the server VNF initiates device tracking and the server instance receives latitude and longitude location data from the user's UE. The VNF instructs the 5G PNF to provide the eNodeB resource map and geo location tracing data to the server instance. The server VNF receives the data and derives map locations according to the latitude-longitude data. The server VNF checks real-time locations against correspondence with injection point locations and injection point boundaries defined according to the configuration policies.

In an embodiment, injection point boundaries correspond to geographic areas surrounding injection points as defined by the configuration policies. Such areas accommodate the reality that moving vehicles approach, pass through and recede from injection points. Maintaining smooth vehicle operation across the injection point have knowledge of how to proceed beyond the injection point. This necessitates providing the next map segment prior to reaching the current injection point. As the device location data indicates that the user has entered an injection point boundary-defined in terms of average time to the injection point or actual distance o the injection point, the method unlocks access to the next map segment and enables that next segment to be pushed to the driver's UE by the server instance directly, or indirectly through a cab booking service instance. Upon receiving the new map segment, the drivers display updates showing the next portion of the highlighted route starting from the injection point or the injection point boundary along the route.

In an embodiment, the method uses the user device radio resource map location data as a key to unlock the access to the next map segment beginning with the current injection point. Prior to receiving location data corresponding to the injection point—such as data indicating that the injection point boundary has been crossed by the device—the method prohibits the sharing of the next map segment with the driver or cab booking service instances. After receiving the data, the map segment access is unlocked, and the map segment is provided. In an embodiment, the cab booking service instance receives an update on route progress as each injection point along the route is reached.

After providing the next map segment, the method continues polling user device location data, seeking corresponding between the real-time data and the next injection point injection point boundary location of the new map segment. The method then proceeds as described above, matching location to injection point target location data and unlocking the next map segment. Access to the final map segment is similar. As the user nears the injection point of the penultimate map segment, the method detects the location data corresponding to the injection point and unlocks access to the final segment. In an embodiment, as the user's location data indicates that the final destination boundary has been crossed, the method pushes an indication that the destination has been reached to the driver and cab service.

In an embodiment, a route masking method includes collecting device location data from eNodeB and Physical Network Function at 5G-VNF of the user's device. The method validates a current location of a first user (e.g., a user requesting a ride from a car service) and uses the user's latitude-longitude data as a key to mask and unmask segmented child maps of a complete route map, for a second user (e.g., a driver of the car service) during the routing of a vehicle (e.g., a car).

In this embodiment, the method continuously collects data from a resource allocation map from respective UE eNodeB in the 5G system over S1 bearer in CP and determine the device location while in transit (e.g., cab ride/car service). The method collects CP-DTCH from the upper layer of CP-VNF functions for which the user has enabled tracking of the ongoing trip (e.g., cab ride). The method gathers location information from the Physical Network Function for which the tracking DTCH is enabled to provide user location tracking in 5G network.

In an embodiment, the method the DTCH and UE, using exact positions from the radio resource map and the in-built device PNF positioning system to collect latitude and longitude information for the user's device. The method initiates and sustains tracing the CP DTCH between UE and eNodeB with an optional S1 extension at VNF functions.

In an embodiment, the method collects route data along with the user's destination location from a cab booking service instance at network function virtualization (NFV) orchestration or from standalone server instances. In this embodiment, collecting route data includes collecting start, end locations along with the map that incorporates traffic-based diversions and other map coordinate information. The method further sends the collected data to the map masking function of the Virtual Network Function instance.

In an embodiment, the mechanism in the 5G-VNF instance collects location coordinates, determines a boundary area for the defined route data and generates the segmented child maps for each route segment. In this embodiment, generating the child map segments includes segmenting a complete route map to the child-maps based on the final destination, defined boundary area and other characterizes received from an activation service. The activation service runs on the UE, is interconnected to the application executing the disclosed methods. This service collects the user location data and provides it the VNF for further processing as described.

In an embodiment, the method implements a constraint satisfaction mechanism for the generated child map segments based on criteria including current vehicle location, current velocity, acceleration, traffic in the region, the location pointer characters (e.g., road junctions, to generate the complete set of usable child map segments of the complete route). In this embodiment, the constraint satisfaction mechanism includes collecting child map segment injection trigger points and moving the trigger points based on derived constraints to generate a logically constrained map, and the elimination or replacement of injection points that may cause driver confusion, like road junctions, U-turn locations, etc. Constraint satisfaction includes injection point shifting.

In an embodiment, the method detects user location data corresponding to the child maps injection points and pushes the next map to the driver's client application. In this embodiment, detecting user location data corresponding to the injection point includes collecting user device latitude and longitude data and sending map push signal when the latitude-longitude data indicates the user is within a defined injection point boundary area. In this embodiment, the method uses the location data as a key to unlock the next child for the application and collects the next logical milestone on driver's app. In this embodiment, the method proactively generates the segmented child-map for next route milestone and determines the location of the next injection point at PNF.

In an embodiment, the method utilizes a geofencing manager in conjunction with the user location data. The geofencing manager selects services and offers, e.g., subscriptions, advertisements, etc., associated with locations within a defined geofence boundary distance around the user's current location and presents details abouts these offers and services to the user.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102 using 5G communications protocols. Client device 104 connects wirelessly to server sub-system 102 via 5G network 114. In an embodiment, Client devices 104, 110 correspond to user and driver UEs. Client devices 104 and 110 comprise route masking program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the route masking program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., route masking program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
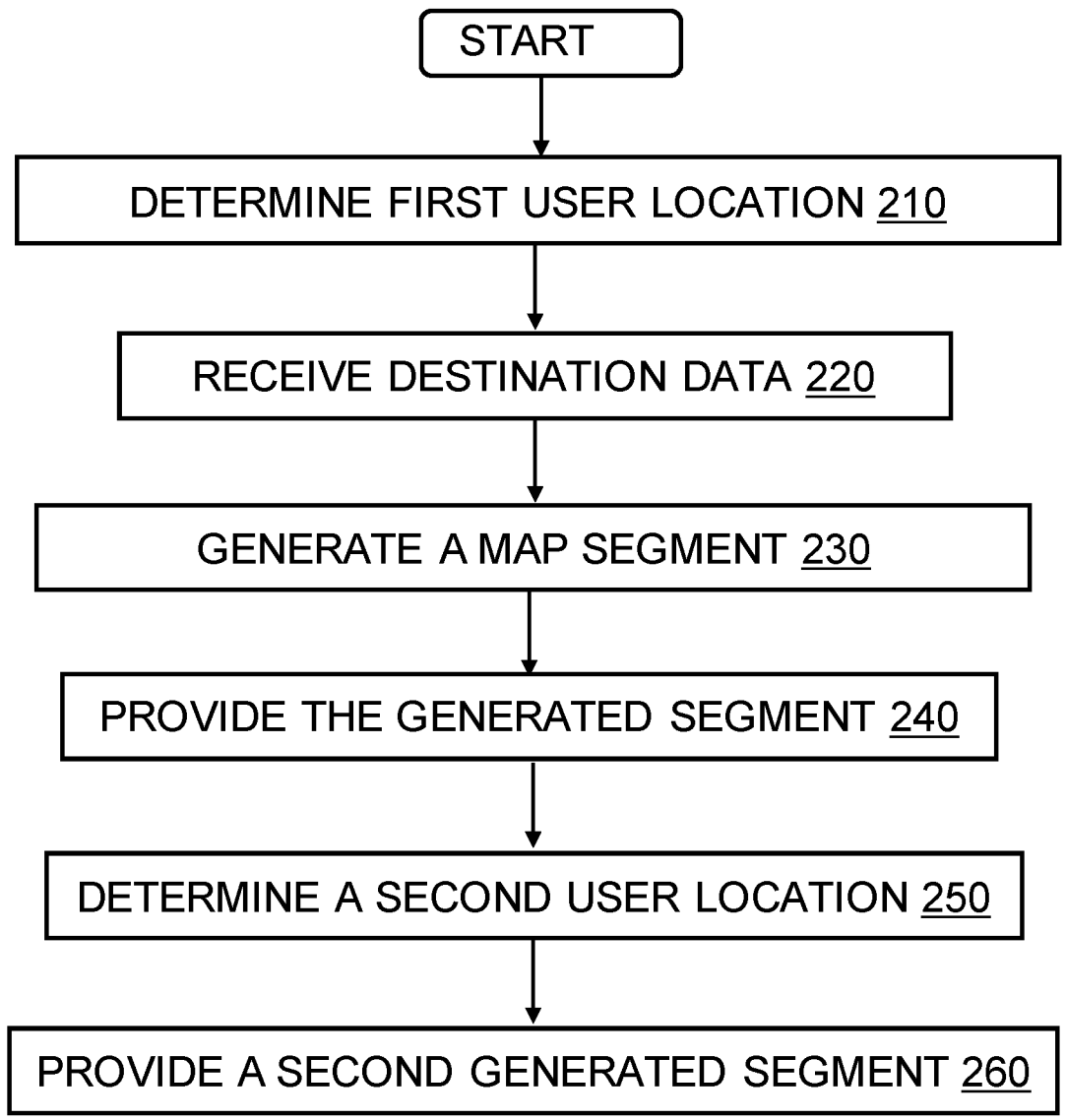
FIG. 2 provides a flowchart depicting an operational sequence, according to an embodiment of the invention.

FIG. 2 provides a flowchart 200, illustrating exemplary activities associated with the practice of the disclosure. After program start, at block 210, the route masking method determines a first location of a user. In an embodiment, the method determines the first location using radio resource map data from a user 5G enabled device after the user opts-in to the collection and use of device location data from the device.

At block 220, the method of route masking program 175 receives final destination data for the user. In an embodiment, the method receives destination data from a client instance associated with a cab booking service via a 5G VNF initiated MAC between a server instance and the client instance.

At block 230, the method generates a child map segment associated with a complete route from the user's starting location and final destination. The child map segment includes an injection point used to trigger access to a subsequent child map segment. In an embodiment, the method generates a complete set of child map segments encompassing the complete route of the user. Each segment including an injection point associated with providing the next segment or indicating the completion of the route. In an embodiment, the method generates each map segment as the injection point of the previous segment is approached by the user according to PNF data provided by the user's device.

At block 240, the route masking program presents the child segment to a second client instance, such as a driver's instance. The driver then proceeds along the portion of the route provided by the child map segment toward the injection point of the provided map segment. In an embodiment, the method also presents the child segment to a third instance such as the cab booking application instance.

At block 250, the route masking method determines a second user location corresponding to the injection point of the provided child map segment. In an embodiment, each injection point includes a precise location as well as a defined boundary encircling the precise location. As a user's location data indicates a crossing of the boundary, the method unlocks the next child map segment. This enables the driver to maintain smooth operation of the vehicle by providing the next segment of the route as the vehicle approaches the end of the currently provided segment.

At block 260, the route masking program pushes the unlocked next segment to the driver's instance of the program. This enables the driver to maintain smooth operation of the vehicle by providing the next segment of the route as the vehicle approaches the end of the currently provided segment. In an embodiment, the method generates the next segment after detecting a boundary crossing for the current segment injection point. The method then pushes the newly generated segment to the driver.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
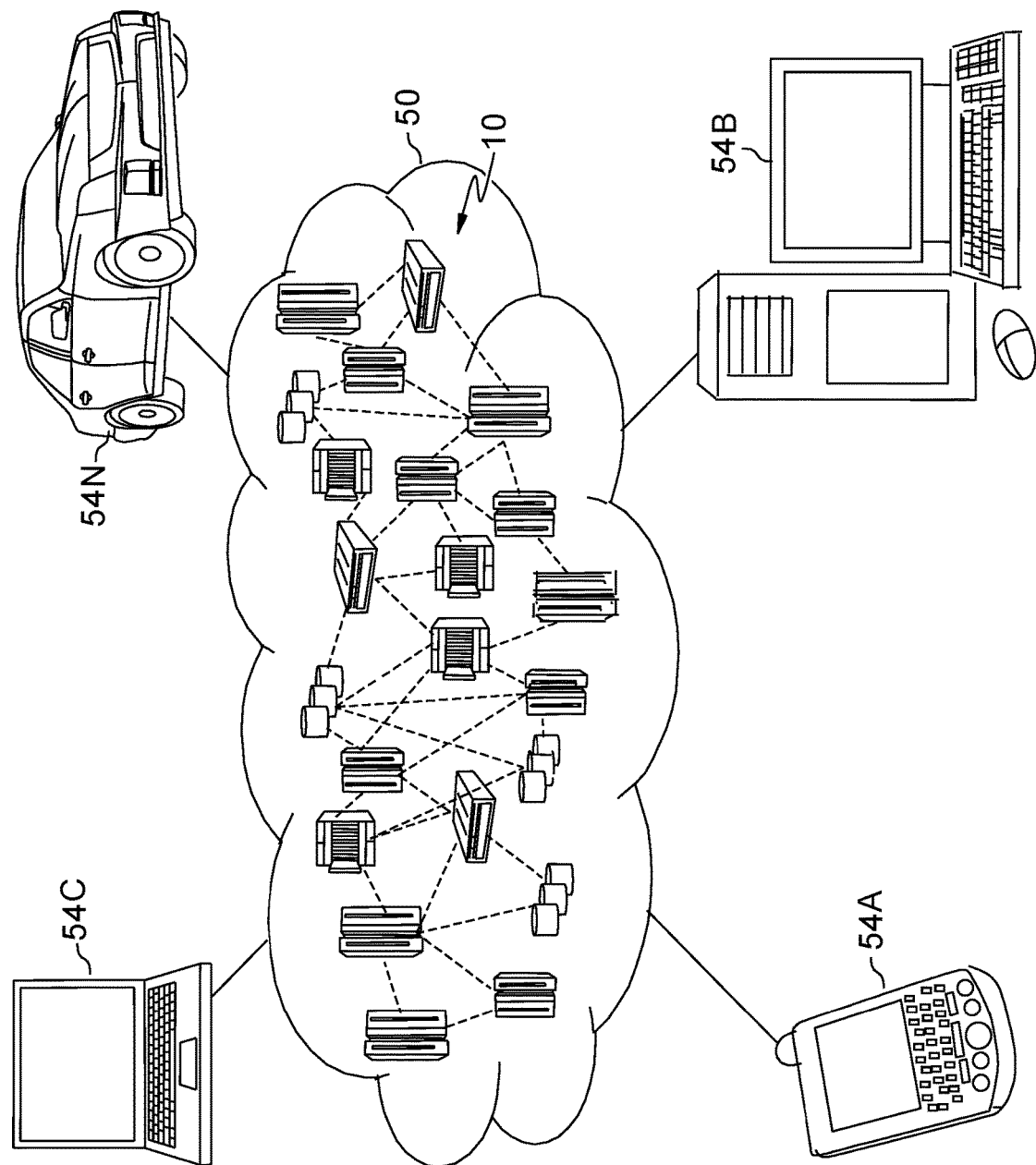
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
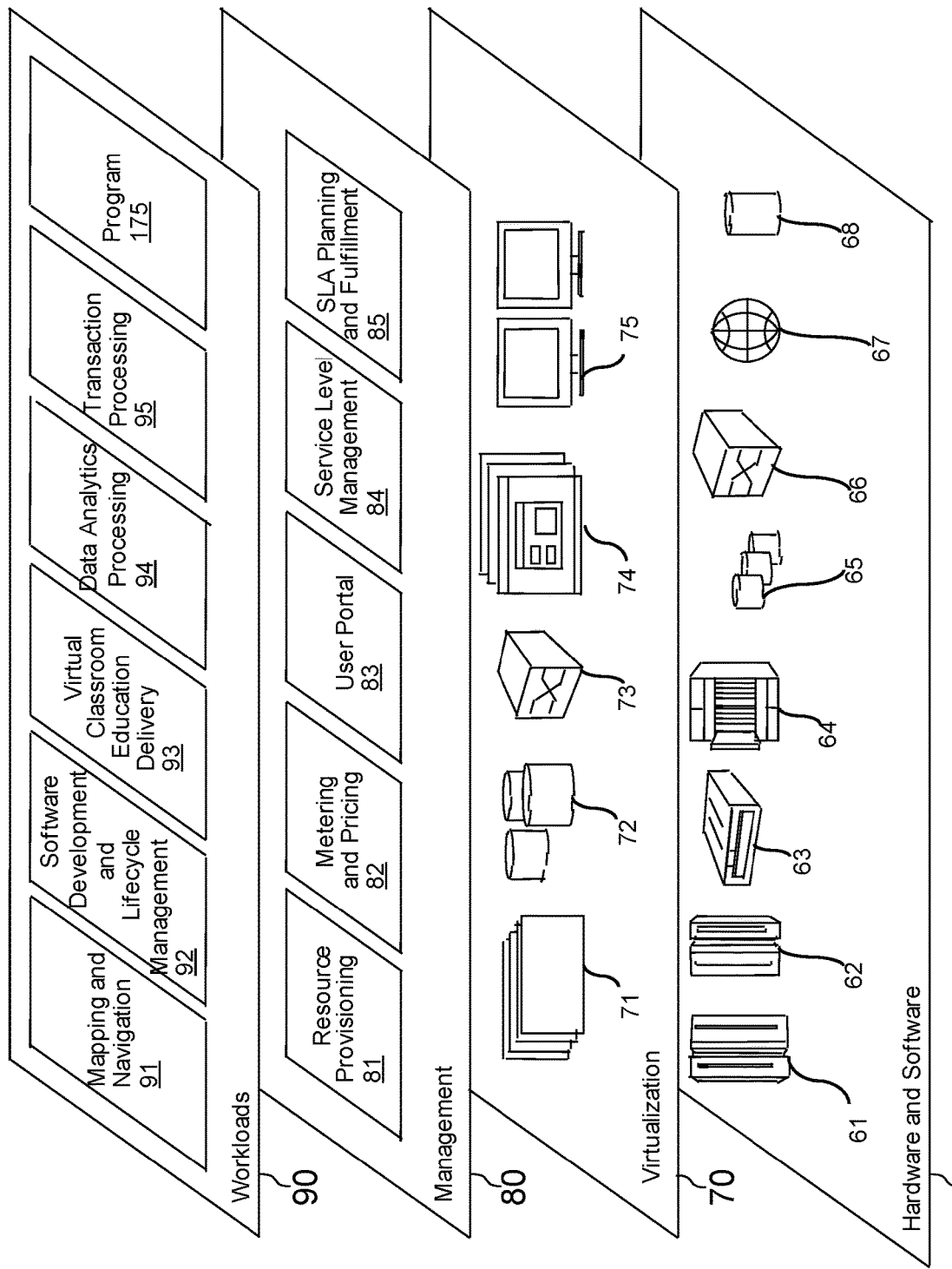
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and route masking program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for masking a route, the method comprising:
   determining, by one or more computer processors, a first location of a first user;
   receiving, by the one or more computer processors, destination data for the first user, wherein the receiving the user destination data comprises using 5G virtual network function resources to receive the user destination data;
   generating, by the one or more computer processors, a plurality of map segments according to the first location and the destination data;
   presenting, by the one or more computer processors, a first map segment to a second user, wherein the second user is providing transportation services to the first user;
   determining, by the one or more computer processors, a second location of the first user; and
   presenting, by the one or more computer processors, a second map segment to the second user according to the second location, wherein the second map segment includes the destination data.

2. The computer implemented method according to claim 1, further comprising:
   presenting, by the one or more computer processors, a complete route map to the first user.

3. The computer implemented method according to claim 1, further comprising:
   determining, by the one or more computer processors, the first location according to 5G physical network function data from a first user device.

4. The computer implemented method according to claim 1, wherein generating the plurality of map segments further comprises generating map segments according to defined constraints.

5. The computer implemented method according to claim 1, further comprising unlocking, by the one or more computer processors, an access to the second map segment according to the second location.

6. The computer implemented method according to claim 1, further comprising presenting, by the one or more computer processors, the second map segment to the second user according to the second location and a map segment injection point location.

7. The computer implemented method according to claim 1, wherein the receiving the user destination data comprises using 5G virtual network function resources to receive the user destination data.

8. A computer program product for masking a route, the computer program product comprising one or more computer readable storage devices and collectively stored program instructions on the one or more computer readable storage devices, the stored program instructions comprising:
   program instructions to determine a first location of a first user;
   program instructions to receive destination data for the first user, wherein the program instructions to receive the user destination data comprise program instructions to use 5G virtual network function resources to receive the user destination data;
   program instructions to generate a plurality of map segments according to the first location and the destination data;
   program instructions to present a first map segment to a second user, wherein the second user is providing transportation services to the first user;
   program instructions to determine a second location of the first user; and
   program instructions to present a second map segment to the second user according to the second location, wherein the second map segment includes the destination data.

9. The computer program product according to claim 8, the stored program instructions further comprising:
   program instructions to present a complete route map to the first user.

10. The computer program product according to claim 8, the stored program instructions further comprising:
    program instructions to determine the first location according to 5G physical network function data from a first user device.

11. The computer program product according to claim 8, wherein program instructions to generate the plurality of map segments further comprise program instructions to generate map segments according to defined constraints.

12. The computer program product according to claim 8, the stored program instructions further comprising program instructions to unlock an access to the second map segment according to the second location.

13. The computer program product according to claim 8, the stored program instructions further comprising program instructions to present the second map segment to the second user according to the second location and a map segment injection point location.

14. The computer program product according to claim 8, wherein the program instructions to receive the user destination data comprise program instructions to use 5G virtual network function resources to receive the user destination data.

15. A computer system for masking a route, the computer system comprising:
    one or more computer processors;
    one or more computer readable storage devices; and
    stored program instructions on the one or more computer readable storage devices for execution by the one or more computer processors, the stored program instructions comprising:

program instructions to determine a first location of a first user;

program instructions to receive destination data for the first user, wherein the program instructions to receive the user destination data comprise program instructions to use 5G virtual network function resources to receive the user destination data;

program instructions to generate a plurality of map segments according to the first location and the destination data;

program instructions to present a first map segment to a second user, wherein the second user is providing transportation services to the first user;

program instructions to determine a second location of the first user; and program instructions to present a second map segment to the second user according to the second location, wherein the second map segment includes the destination data.

16. The computer system according to claim 15, the stored program instructions further comprising:

program instructions to present a complete route map to the first user.

17. The computer system according to claim 15, the stored program instructions further comprising:

program instructions to determine the first location according to 5G physical network function data from a first user device.

18. The computer system according to claim 15, wherein program instructions to generate the plurality of map segments further comprise program instructions to generate map segments according to defined constraints.

19. The computer system according to claim 15, the stored program instructions further comprising program instructions to unlock an access to the second map segment according to the second location.

20. The computer system according to claim 15, the stored program instructions further comprising program instructions to present the second map segment to the second user according to the second location and a map segment injection point location.

* * * * *